US012516650B2

(12) United States Patent
Edwards et al.

(10) Patent No.: US 12,516,650 B2
(45) Date of Patent: Jan. 6, 2026

(54) METHOD AND APPARATUS FOR HARD MACHINING ORIFICES IN FUEL SYSTEM AND ENGINE COMPONENTS

(71) Applicant: Cummins Inc., Columbus, IN (US)

(72) Inventors: Romaine O. Edwards, Greenwood, IN (US); Jason R. Garcia, Franklin, IN (US); Steve W. Gillespie, Columbus, IN (US)

(73) Assignee: Cummins-Scania HPCR System, LLC, Columbus, IN (US)

( * ) Notice: Subject to any disclaimer, the term of this patent is extended or adjusted under 35 U.S.C. 154(b) by 113 days.

(21) Appl. No.: 18/519,527

(22) Filed: Nov. 27, 2023

(65) Prior Publication Data

US 2024/0084770 A1 Mar. 14, 2024

Related U.S. Application Data

(63) Continuation of application No. PCT/US2022/033086, filed on Jun. 10, 2022.

(Continued)

(51) Int. Cl.

*F02M 61/16* (2006.01)
*B23B 35/00* (2006.01)
*F02M 61/18* (2006.01)

(52) U.S. Cl.

CPC ........... *F02M 61/168* (2013.01); *B23B 35/00* (2013.01); *F02M 61/1806* (2013.01); *F02M 2200/80* (2013.01)

(58) Field of Classification Search

CPC ............. F02M 61/168; F02M 61/1806; F02M 2200/80; F02M 2200/9061; F02M 61/042;

(Continued)

(56) References Cited

U.S. PATENT DOCUMENTS 5,765,755 A * 6/1998 Peters .................... F02M 45/10 239/90
5,827,582 A 10/1998 Quadir et al.

(Continued)

FOREIGN PATENT DOCUMENTS

DE 10354467 A1 * 6/2005 ......... F02M 61/1826

OTHER PUBLICATIONS

International Search Report and Written Opinion, PCT Appln. No. PCTUS2233086, filed Jun. 10, 2022, mailed Aug. 25, 2022, 19 pgs.

*Primary Examiner* — Yi-Kai Wang

(74) *Attorney, Agent, or Firm* — Taft Stettinius & Hollister LLP

(57) ABSTRACT

A method for hard machining at least one orifice into a heat-treated fuel system component can include mounting the component into a holding fixture. The at least one orifice can include a first orifice. The method can include determining a desired orifice size of the at least one orifice based on a desired flow rate. The method can include hard machining the first orifice into the component. The method can include forming a first portion of the first orifice. The method can include forming, at an end of the first portion, a second portion of the first orifice. A diameter of the second portion can be smaller than a diameter of the first portion. The method can include forming a corner between the first portion and the second portion. The corner can have an edge condition having a dimension of 50 microns or less.

20 Claims, 8 Drawing Sheets

Related U.S. Application Data

(60) Provisional application No. 63/209,607, filed on Jun. 11, 2021.

(58) Field of Classification Search
CPC . F02M 61/10; F02M 2200/8069; B23B 35/00
USPC .......................................................... 123/445
See application file for complete search history.

(56) References Cited

U.S. PATENT DOCUMENTS

| | | | | |
|---|---|---|---|---|
| 5,979,052 | A | 11/1999 | Horrie et al. | |
| 6,267,301 | B1 * | 7/2001 | Haruch | B05B 7/0892 239/290 |
| 6,789,406 | B2 | 9/2004 | Spencer | |
| 7,202,441 | B2 | 4/2007 | Klugl et al. | |
| 9,611,824 | B2 | 4/2017 | Gami | |
| 2005/0244236 | A1 | 11/2005 | Bosman | |
| 2006/0231065 | A1 | 10/2006 | Pontoppidan | |
| 2011/0011954 | A1 | 1/2011 | Gunji et al. | |
| 2012/0012681 | A1 | 1/2012 | Peters et al. | |
| 2012/0247427 | A1 | 10/2012 | Saito et al. | |
| 2014/0203109 | A1 * | 7/2014 | Geisser | F02M 61/1886 239/584 |
| 2015/0190753 | A1 | 7/2015 | Stroia et al. | |
| 2015/0345453 | A1 | 12/2015 | Schneider et al. | |
| 2016/0195052 | A1 | 7/2016 | Kaneta | |
| 2016/0221118 | A1 * | 8/2016 | Yamashita | B23K 26/0608 |
| 2017/0030315 | A1 | 2/2017 | Bauer | |

* cited by examiner

METHOD AND APPARATUS FOR HARD MACHINING ORIFICES IN FUEL SYSTEM AND ENGINE COMPONENTS

CROSS-REFERENCE TO RELATED APPLICATION

This application is a continuation of International PCT Application No. PCT/US2022/33086 filed on Jun. 10, 2022, which claims priority to U.S. Provisional Application No. 63/209,607, filed on Jun. 11, 2021, which are incorporated herein by reference in their entirety for all purposes.

TECHNICAL FIELD OF THE DISCLOSURE

The present disclosure relates to a method and apparatus for hard machining orifices in various fuel system and engine components and, more particularly, to precision hard machining of orifices and small internal holes for engine, fuel systems, dosers and drivetrain components.

BACKGROUND OF THE DISCLOSURE

Machining orifices and small internal holes can include utilizing special machine tools, fixtures, cutting tools and manufacturing processes in order to make a precise feature. Current methods and apparatuses use abrasive flow machining to create various orifices in fuel system and engine components.

SUMMARY OF THE DISCLOSURE

Disclosed herein are methods for hard machining at least one orifice into a heat-treated fuel system component. Such a method can include the at least one orifice including a first orifice. The method can include mounting the heat-treated fuel system component into a holding fixture. The method can include determining a desired orifice size of the at least one orifice based on a desired flow rate. The method can include hard machining the first orifice into the heat-treated fuel system component. The hard machining the first orifice can include forming (e.g., machining) a first portion of the first orifice. The hard machining the first orifice can further include forming, at an end of the first portion, a second portion of the first orifice. A diameter of the second portion can be smaller than a diameter of the first portion. The hard machining the first orifice can include forming a corner between the first portion and the second portion. The corner can have an edge condition. The edge condition can have a dimension of 50 microns or less.

In examples, the hard machining the first orifice can include precision sizing at least one of the first portion and the second portion. In examples, forming a corner can include forming the edge condition as a chamfer (e.g., a linear transitional edge between end 18*a* and second portion 20). In examples, forming a corner can include forming the edge condition as a round (e.g., a convex radiused transition between end 18*a* and second portion 20).

In examples, the method can include performing the hard machining the at least one orifice by a machine tool. In this regard, the holding fixture can be a stationary holding fixture of the machine tool. In examples, the determining the desired orifice size can include selecting the desired orifice size based on a graph correlating a set of orifice sizes to a set of flow rates.

In examples, the method can include the at least one orifice further including a second orifice. The second orifice can include a cross hole. In this regard, the method can further include hard machining the second orifice into the heat-treated fuel system component. The second orifice can have a different configuration than the first orifice. The hard machining the second orifice can include forming a flat bottom pilot. The hard machining the second orifice can further include end machining the cross hole into the flat bottom pilot.

In examples, the method can include the forming the first portion further including hard machining a face into the heat-treated fuel system component. The forming the first portion can further include hard machining a pilot hole into the heat-treated fuel system component.

In examples, the method can optionally include the heat-treated fuel system component being an injector needle.

In another embodiment of the present disclosure, a heat-treated fuel system component can include at least one orifice. The at least one orifice can be hard machined into a body of the heat-treated fuel system component based on a desired flow rate of the at least one orifice. The at least one orifice can include a first orifice. The first orifice can include a first portion and a second portion. The second portion can be hard machined at an end of the first portion. A diameter of the second portion can be smaller than a diameter of the first portion. A corner between the first portion and the second portion can have an edge condition. The edge condition can have a dimension of 50 to 100 microns. In other aspects, the edge condition can be 50 microns or less.

In examples, the edge condition can include a chamfer. In examples, the edge condition can include a round.

In examples, the at least one orifice can further include a second orifice. The second orifice can include at least one of a flat bottom pilot and a cross hole.

In examples, the first portion can include a face hard machined into the heat-treated fuel system component. A pilot hole can be hard machined into the heat-treated fuel system component.

In examples, the heat-treated fuel system component can optionally include an injector needle.

A machining system can include a component fixture configured to mount a heat-treated fuel system component. The machining system can further include a machine tool. The machine tool can be configured to form a first portion of a first orifice of at least one orifice in the heat-treated fuel system component. The machine tool can further be configured to form, at an end of the first portion, a second portion of the first orifice. A diameter of the second portion can be smaller than a diameter of the first portion. The machine tool can further be configured to form a corner between the first portion and the second portion. The corner can have an edge condition having a dimension of 50 microns or less.

In examples, the system can further comprise a forming component configured to receive a drill bit. The forming component can further be configured to translate up and down relative to the component fixture to drill the at least one orifice into the heat-treated fuel system component held by the component fixture.

In examples, the component fixture can be formed of a rigid material configured to support a load applied to the fixture.

Advantages and features of the embodiments of this disclosure will become more apparent from the following detailed description of exemplary embodiments when viewed in conjunction with the accompanying drawings.

DETAILED DESCRIPTION OF THE DRAWINGS

Figure 1:
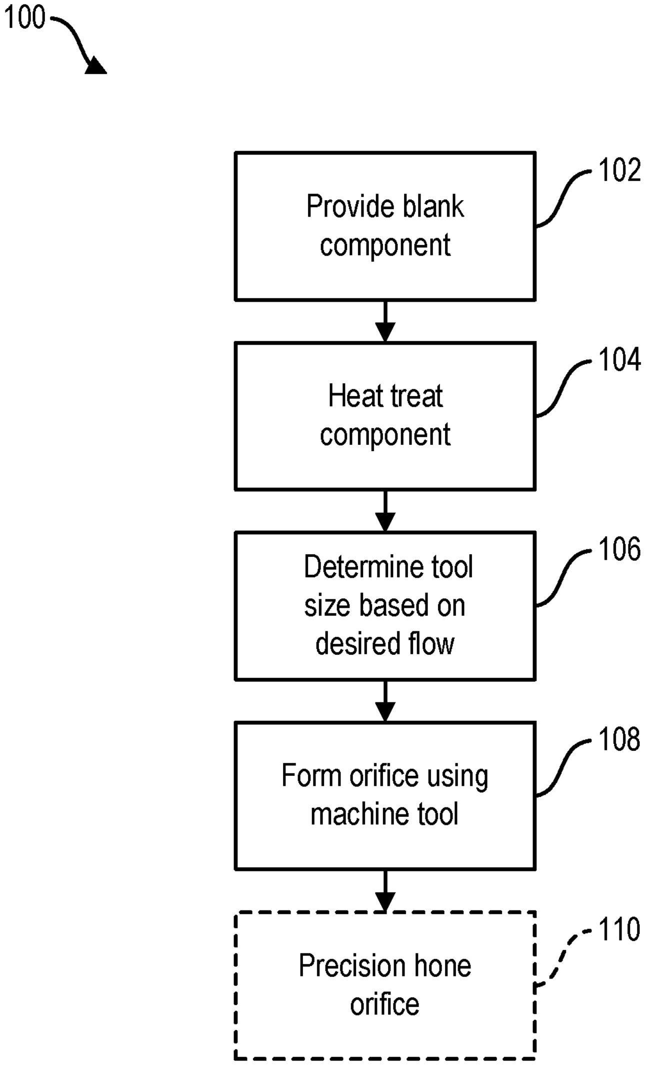
FIG. 1 shows a flow chart for an embodiment of a method for manufacturing a fuel system component according to the present disclosure.

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings. It is not beyond the scope of this disclosure to have a number (e.g., all) the features in a given embodiment to be used across all embodiments.

Aspects of the disclosure provide several advantages over existing methods. For instance, such methods can reduce the capital investment and cycle time for machining of orifices and small internal holes for engine, fuel systems, dosers and drivetrain components and reduces proliferation across applications. Traditional methods include end milling a component where forming of the hole is performed following a helical path (e.g., movement along the x, y, and z axes), which introduces air that will affect flow properties of the machining. Artisans have turned to abrasive flow machining (AFM) for this reason, but AFM lacks the precision required for certain forming. With the disclosed method, components can be hard drilled using drill edges that account for heat profile of the forming, material type, and hardness and performed without forming in a helical pattern, resulting in a simple directional forming pattern. Thus, embodiments of the present disclosure can facilitate production of fluid components, such as fuel system components, having relatively consistent, accurate flow rates. Component tuning is even more possible without driving changes to the manufacturing process. Employing principles of the present disclosure can optimize engine-related components while keeping cost to develop very low. Hard machining capabilities can save money across the global manufacturing organization and can be applied in many different applications.

Devices, systems, and methods of the present disclosure can be employed when it is desirable to have precision-made holes that are used to control, direct, and transfer fluid, such as air. Such fluid can have a flow that is sensitive to certain parameters like size, surface finish, shape, sharp edges and high flow rates. Certain existing methods like electrical discharge machining (EDM) and Laser can include high investment costs and development time. Other existing methods like electro chemical machining (ECM), electro chemical deburring (ECD), soft machining can exhibit relatively low accuracy. Yet other existing methods (such as abrasive flow machining (AFM) and honing) can be expensive, cumbersome, and/or require additional processes.

Figure 2:
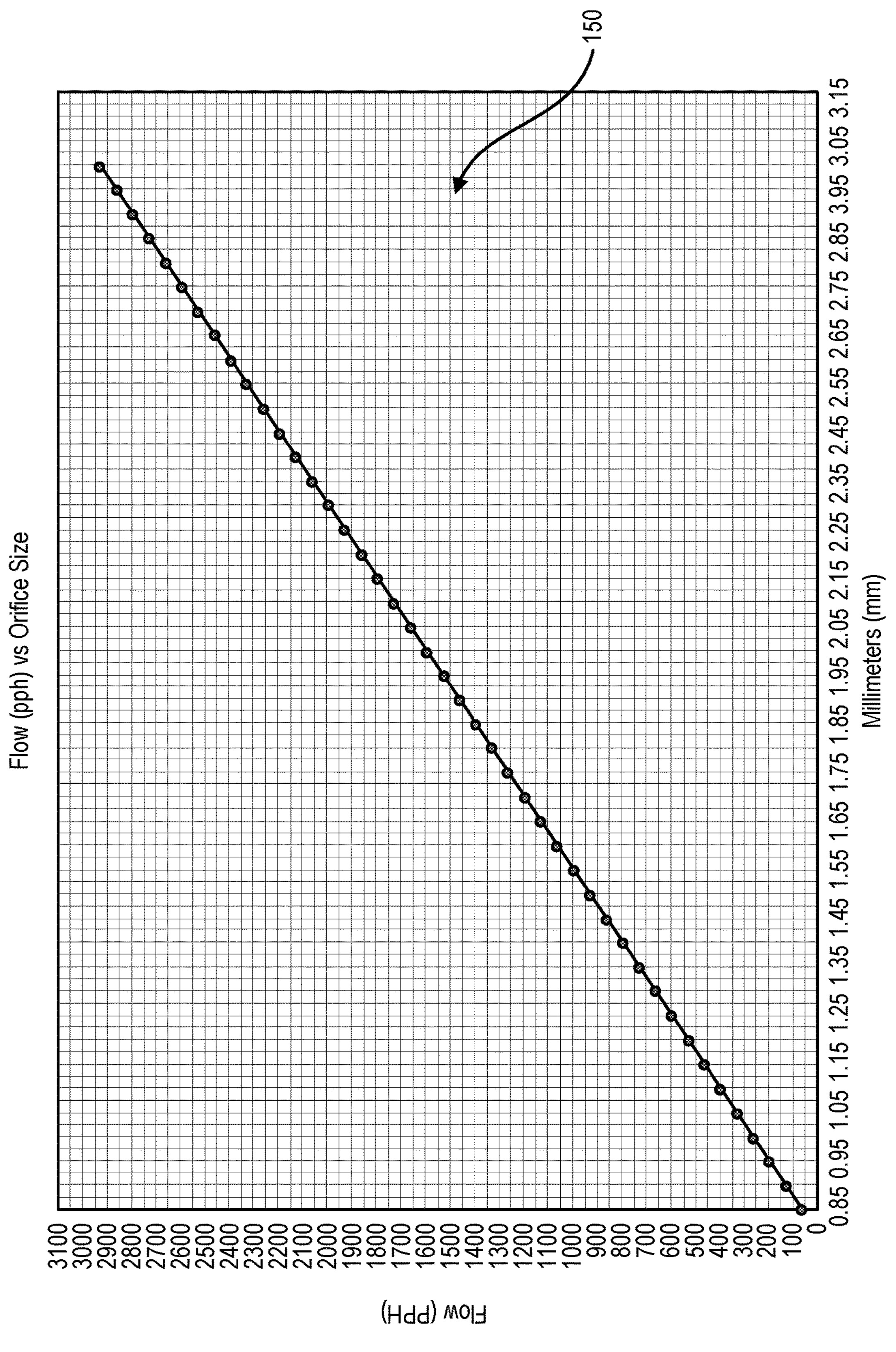
FIG. 2 shows a graph correlating orifice/drill bit size in millimeters to flow rate in pound per hour (pph)
Figure 3:
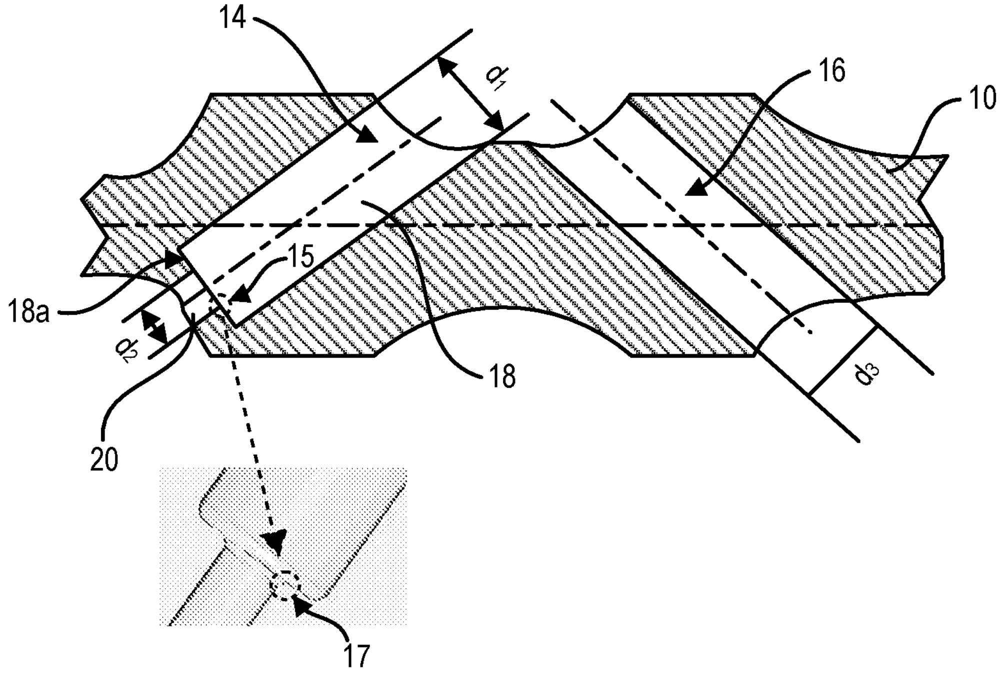
FIG. 3 shows a cross-sectional view of a portion of a component having first and second orifices of the present disclosure.

Various aspects of methods disclosed herein can be seen in FIGS. 1-3. In particular, FIG. 1 shows a flow chart for an embodiment of a method for manufacturing fuel system and engine components according to the present disclosure. FIG. 2 shows a graph correlating orifice/drill bit size in millimeters to flow rate in pound per hour (pph). FIG. 3 shows a cross-sectional view of a portion of a component having first and second orifices of the present disclosure.

Figure 7:
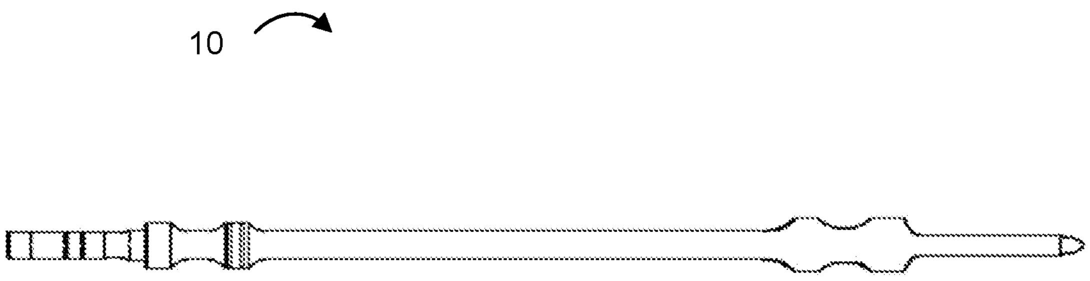
FIG. 7 shows an example blank component (a blank injector needle component having no orifices), according to embodiments of the present disclosure.
Figure 8:
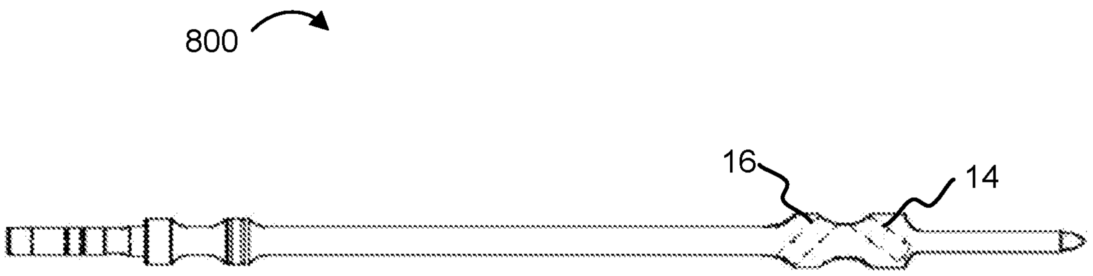
FIG. 8 shows an example injector needle, according to embodiments of the present disclosure.

Referring to FIGS. 1-3, a method 100 for manufacturing fuel system and engine components, such as injector needle 800, FIG. 8, is provided. The method 100 generally includes providing a blank component (e.g., blank component 10, FIG. 7) at step 102. The method 100 includes heat treating blank component 10 to a hardness, for example, over 55 HRC at step 104 and determining tool sizes for orifices 14, 16 based on a desired flow rate at step 106. The method 100 further includes hard machining orifices 14, 16 into blank component 10 using the determined tool bit size and a machine tool 400, FIG. 6 at step 108. Step 108 of method 100 includes hard machining. Hard machining can include machining (e.g., drilling and/or milling) a component having a hardness that exceeds a threshold hardness, such as 45 HRC (Rockwell Hardness Scale). For example, in some instances, hard machining can include machining a component having a hardness ranging from approximately 58 HRC to 70 HRC. Optionally, at least one of the orifices 14, 16 can be precision honed at step 110. Method 100 can produce a heat-treated fuel system component, such injector needle 800, FIG. 8.

Machine tools can include milling machines, lathes, drill presses, and the like. To determine the tool bit size for orifice 14, 16, graph 150 (FIG. 2) may be used where the desired flow rate is provided on the Y-axis in pounds per hour (pph) and the corresponding tool bit size in millimeters (mm), and thus diameter of orifice 14, 16, is provided on the X-axis. By using graph 150, initial hydraulic flow measurements and AFM are not needed to achieve a desired flow rate.

A method for hard machining, as in step 108, at least one orifice 14, 16 into a heat-treated fuel system component 10 includes mounting the heat-treated fuel system component 10 into a holding fixture (e.g., 500, FIG. 6), determining a desired orifice size of the at least one orifice 14, 16 based on a desired flow rate, and hard machining the first orifice 14 into the heat-treated fuel system component 10. The desired orifice size for the first orifice 14 can include a first diameter, d1 and a second diameter, d2, FIG. 3. The desired orifice size for the second orifice 16 can include a third diameter d3, FIG. 3. Hard machining the first orifice 14 includes forming a first portion 18 of the first orifice 14, as, for example, is shown in 202 and 204, FIG. 4, and forming, at an end 18*a* of the first portion 18, a second portion 20 of the first orifice 14. A diameter of the second portion 20 is smaller than a diameter of the first portion 18, as, for example, is shown in FIG. 3. The example method of step 108 includes forming a corner 15, FIGS. 3, 4, between the first portion 18 and the second portion 20. The corner 15, has an edge condition 17, such as a chamfer or round, having a dimension of 50-100 microns, in other aspects, 50 microns or less.

Hard machining the first orifice can further includes precision sizing at least one of the first portion 18 and the second portion 20. Forming a corner 15 can include forming the edge condition as a chamfer or as a round. Determining the desired orifice size can include selecting the desired orifice size based on a graph, such as the graph shown in FIG. 2, correlating a set of orifice sizes to a set of flow rates.

Figure 6:
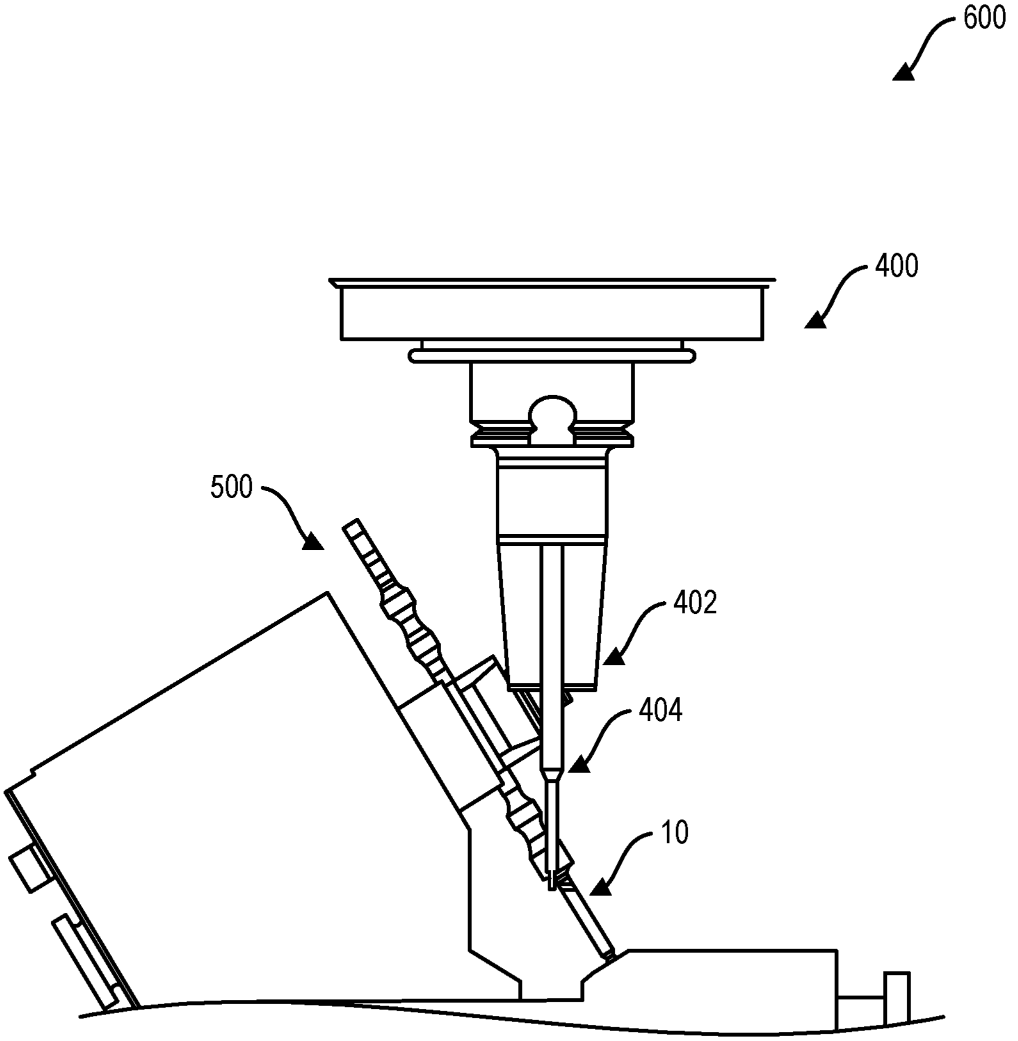
FIG. 6 shows a side plan view of a modified machine tool of the present disclosure including a component fixture.

The example method of step 108 can further include performing the hard machining the at least one orifice 14, 16 by a machine tool 400, wherein the holding fixture is a stationary holding fixture 500 (shown in FIG. 6) of the machine tool 600 (shown in FIG. 6).

Figure 4:
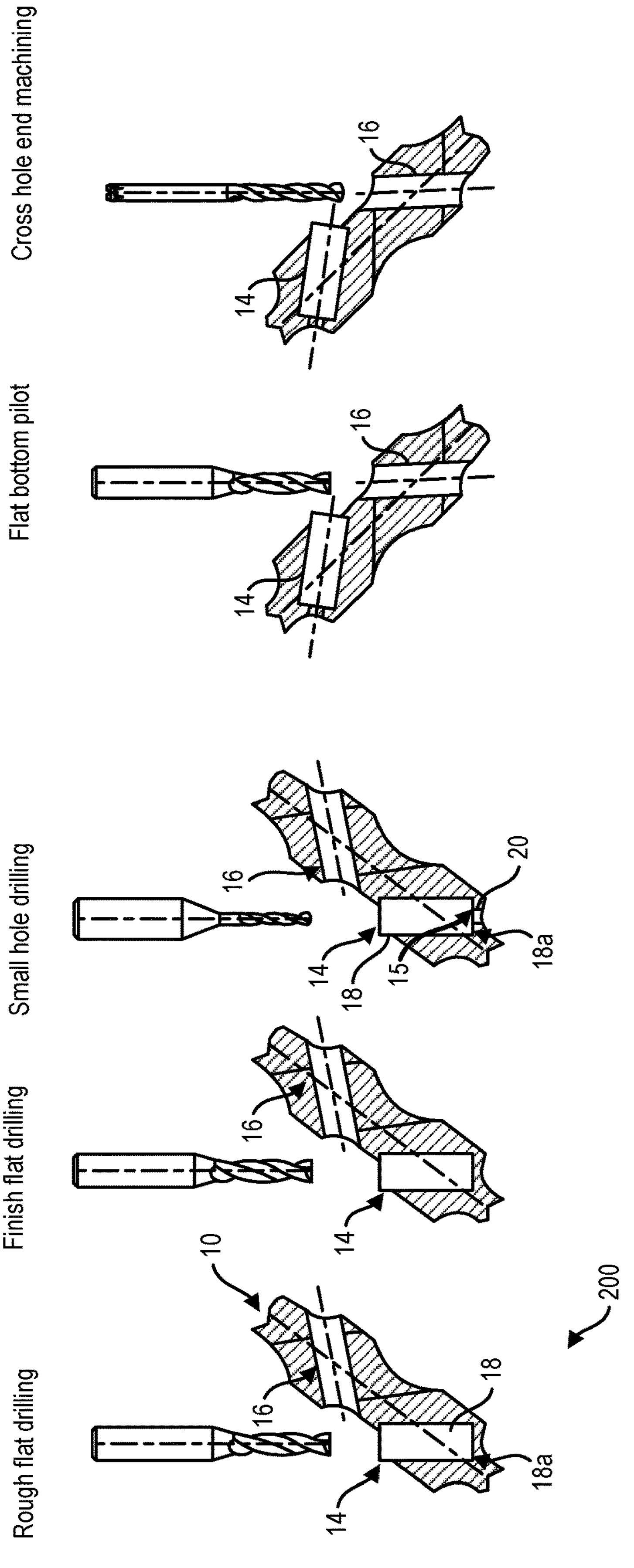
FIG. 4 shows diagrams for an embodiment of a method for hard machining orifices into fuel system and engine components according to the present disclosure.

The example method of step 108 can further include the at least one orifice 14, 16 including a second orifice 16 comprising a cross hole (see, e.g., FIG. 4). In this regard, the method of step 108 can further include hard machining the second orifice 16 into the component 10. The second orifice 16 can have a different configuration than the first orifice 14. The hard machining the second orifice 16 can include forming a flat bottom pilot (see, e.g., FIG. 4). The hard machining the second orifice can further include end machining the cross hole into the flat bottom pilot (see, e.g., FIG. 4).

Figure 5:
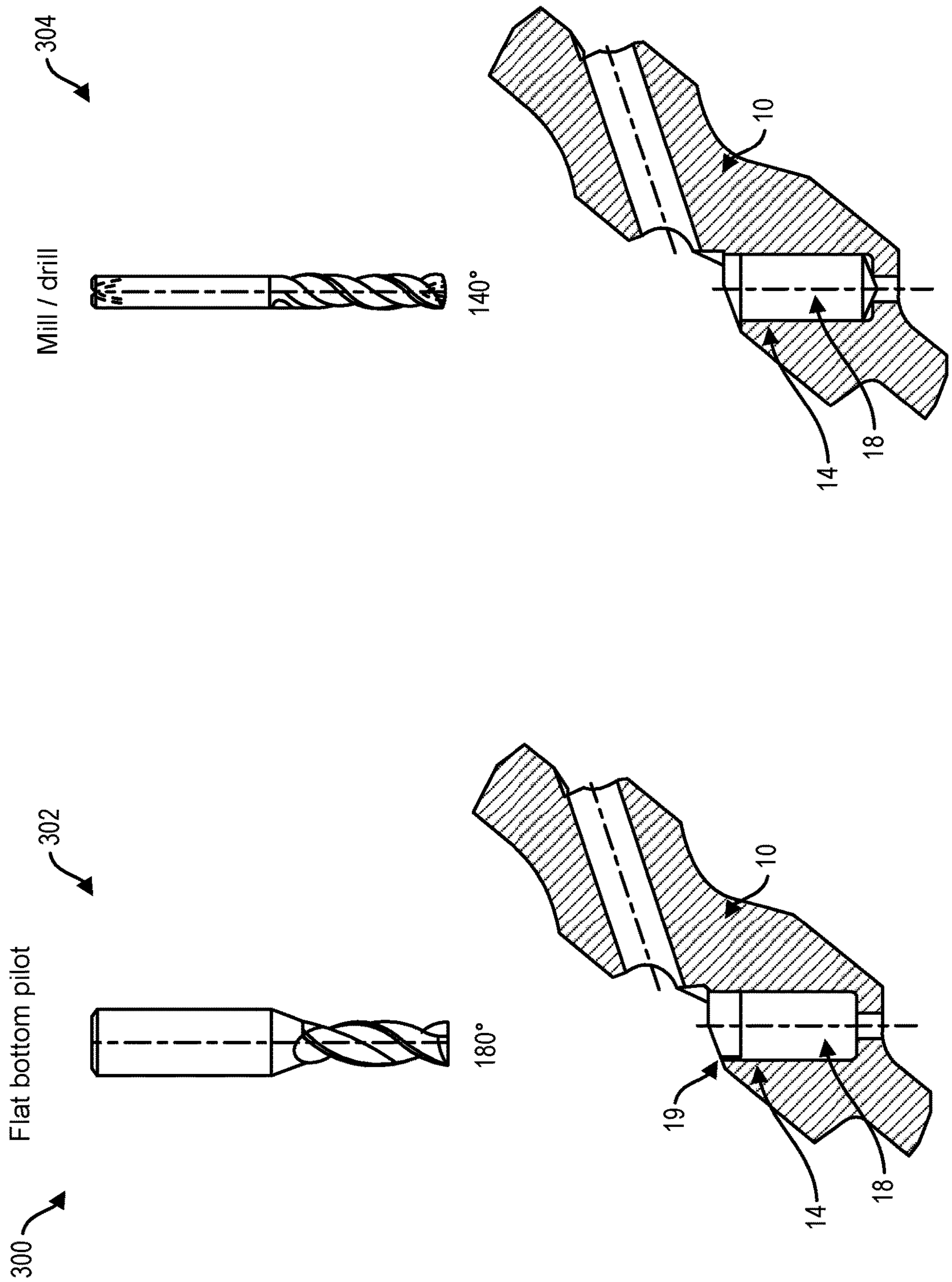
FIG. 5 shows diagrams of steps of a portion of an embodiment of a method for hard machining orifices into fuel system and engine components according to the present disclosure.

In examples, the method of step 108 can include the forming the first portion 18 further including hard machining a face into the heat-treated fuel system component (see, e.g., FIG. 5). The forming the first portion 18 can further include hard machining a pilot hole into the heat-treated fuel system component (see, e.g., FIG. 5).

In examples, the method of step 108 can optionally include mounting the heat-treated fuel system component into a holding fixture including mounting an injector needle blank 10 as the heat-treated fuel system component.

In examples, the method of step 108 can optionally include a heat-treated fuel system component, such as an injector needle 800, formed using the method 100, and more specifically step 108, described above.

Experimental results have substantiated aspects of the present disclosure and are shown in FIG. 2. A variety of orifice sizes were made using the hard machining process and then measured on hydraulic flow test to verify flow rates. As seen in this figure, the results indicate that there is a linear relationship of flow as a function on orifice size. In general, a larger orifice will yield a high volumetric or mass flow rate for a given condition. This relationship can be useful in predicting what drill size should be used to achieve a desired flow at a set pressure drop across the orifice. It has been shown that hard machining according to principles disclosed herein can achieve the specifications for flow and be competitive to the current production process. Capability analysis was done on various hard drilled parts during development, and the results reveal that the process is capable with notable improvements in that no initial hydraulic flow measurement is needed and no AFM process is required to achieve the final print specification for flow. Final flow can be achieved by picking the correct drill per flow curve previously established, then producing the orifice, thereby avoiding additional process currently performed in production.

Aspects of another embodiment employing principles of the present disclosure are seen in FIGS. 4-6. In particular, FIG. 4 shows diagrams for an embodiment of a method for hard machining orifices into fuel system and engine components according to the present disclosure. FIG. 5 shows diagrams of steps of a portion of an embodiment of a method for hard machining orifices into fuel system and engine components according to the present disclosure. FIG. 6 shows a side plan view of a modified machine tool of the present disclosure including a component fixture. FIG. 3 is also illustrative for this embodiment and is referenced in the discussion below.

As indicated in FIG. 6, when machining orifice 14, 16 into blank component 10, component 10 is supported or held by a table or fixture 500 of machine tool 400. In various embodiments, method 100 may further include step 110 in which orifice 14, 16 is precision sized (e.g., precision honed using a precision honing tool) to further define the orifice size, which allows for a very precise diameter of orifice 14, 16. In examples, precision sizing can be performed by one machine tool setup (e.g., all machining operations performed by one machine) or multiple machine tool setups (e.g., all machining operations performed sequentially or consecutively by different machines). For example (referring to FIG. 3), orifice 16 may be drilled into component 10 with a 3 mm drill bit at step 108, and orifice 14 can have a smaller orifice 20 drilled into the component as a pilot hole. Then the smaller orifice 20 may be precision honed to a larger and more precise orifice size. Hard machining orifice 14, 16 into blank component 10 after heat treating component 10 allows for any changes or distortions to orifice 14, 16 that may be caused by heat treating to be avoided. In addition, forming orifice 14, 16 and 20 using a machine tool and desired cutting tool (e.g., a drill bit or milling tool) allows for additional accuracy for the flow rate of fuel system or engine component 10.

With reference to FIGS. 3-5, in various embodiments, component 10 may include first orifice 14 extending through component 10 and second orifice 16 extending through component 10, where first orifice 14 may include a first portion 18 having a first diameter $d_1$ and end 18*a* and a second portion 20 having a second diameter $d_2$. In various embodiments, a diameter $d_3$ of second orifice 16 may be equal to first diameter $d_1$, while in other various embodiments, diameter $d_3$ may be smaller or larger than $d_1$. In general, orifices 14 and 16 have straight, flat edged surfaces for fluid flow.

Referring to FIG. 4, to form orifices 14 and 16 into component 10, method 200 may be followed. To begin, first portion 18 of first orifice 14 is drilled to a rough flat into component 10 at step 202. Then, first portion 18 of first orifice 14 is drilled to a finish flat in component 10 at step 204. For example, step 204 can include machining the surface of the orifice in the first portion 18 such that it is smoother than it was following the machining in step 202. Next, second portion 20 of first orifice 14 is drilled into component 10 at an end 18*a* of first portion 18 and through to an exterior surface of component 10 at step 206 such that a sharp edge or corner 15 having 100 microns or less of edge condition (such as chamfer or round) exists between first portion 18 and second portion 20. By keeping any chamfer or round between first portion 18 and second portion 20 at 100 microns or less (e.g., 20, 50, 75 microns, etc.) the accuracy and precision of the flow rate for first orifice 14 may be improved. Second orifice 16 may be provided in component 10 via a flat bottom pilot at step 208 and then a cross hole end machined at step 210 either prior to or subsequent to first orifice 14 being machined into component 10. In an example, step 210 can include machining (e.g., end milling) the surface of the second orifice 16 such that it is smoother than it was following the machining in step 208, forming a cross hole. In various embodiments, first orifice 14 may be provided in component 10 via method 300 (FIG. 5), where first portion 18 is provided via a face 19 being machined into component 10 followed by a pilot hole being machined into component 10 at step 302 and then first portion 18 being machined (e.g., milled or drilled) into component 10 at step 304.

FIG. 6 illustrates a machining system 600 including a machine tool 400 and component fixture 500 configure 600*d* for hard machining orifices in accordance with embodiments of the present disclosure. For example, machine tool 400 may be configured to perform methods discussed with respect to FIGS. 1-5. The machine tool 400 may be a mill machine configured to drill rather than mill, where component fixture 500 is stationary relative to a forming component 402 of modified machine tool 400 rather than rotary. In examples, the fixture 500 can position the component 10 such that a length of the component 10 is transverse (e.g., at an acute, obtuse, or right angle) to the direction of forming. Forming component 402 is configured to receive various drill bits 404 and to translate up and down relative to component fixture 500 to drill orifices 14, 16 into component 10 held by component fixture 500. In various embodiments, forming component 402 may include coolant or other cooling mechanism to reduce temperatures of component to preserve the component's shape and increase the life of the component. Component 402 may alternatively be sprayed with a liquid or gas, such as carbon dioxide, for cooling, or component 402 may be made of a specific material, such that coolant is not needed. In various embodiments, forming component 402 may be controlled with computer numerical control (CNC) or other various programmable control systems. Fixture 500 is generally formed of a stiff or rigid material configured to handle the load applied to fixture 500 through component 10 without flexing or wearing away.

FIG. 7 shows an example blank component 10, according to embodiments of the present disclosure.

FIG. 8 shows an example injector needle 800 having a first orifice 14 and a second orifice 16, according to embodiments of the present disclosure.

It is well understood that methods that include one or more steps, the order listed is not a limitation of the claim unless there are explicit or implicit statements to the contrary in the specification or claim itself. It is also well settled that the illustrated methods are just some examples of many examples disclosed, and certain steps can be added or omitted without departing from the scope of this disclosure. Such steps can include incorporating devices, systems, or methods or components thereof as well as what is well understood, routine, and conventional in the art.

The connecting lines shown in the various figures contained herein are intended to represent exemplary functional relationships and/or physical couplings between the various elements. It should be noted that many alternative or additional functional relationships or physical connections can be present in a practical system. However, the benefits, advantages, solutions to problems, and any elements that can cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone can be present in an embodiment, B alone can be present in an embodiment, C alone can be present in an embodiment, or that any combination of the elements A, B or C can be present in a single embodiment; for example, A and B, A and C, B and C, or A and B and C.

In the detailed description herein, references to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but can include other elements not expressly listed or inherent to such process, method, article, or apparatus.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

What is claimed is:

1. A method for hard machining at least one orifice into a heat-treated fuel system component, the at least one orifice comprising a first orifice, the method comprising:

mounting a heat-treated blank of the heat-treated fuel system component into a holding fixture;

determining a desired orifice size of the at least one orifice based on a desired flow rate; and hard machining the first orifice into the heat-treated blank of the heat-treated fuel system component, the hard machining the first orifice comprising:

forming a first portion of the first orifice into the heat-treated fuel system component to a finish flat of the first portion, and forming, through the heat-treated fuel system component from the finish flat of the first portion, a second portion of the first orifice such that a corner is formed between the finish flat of the first portion and the second portion, wherein a diameter of the second portion is smaller than a diameter of the first portion; and the corner is formed so that an edge condition exists between the finish flat of the first portion and the second portion of the first orifice having a dimension of 50 microns or less.

2. The method of claim 1, wherein the hard machining the first orifice further comprises:

precision sizing at least one of the first portion and the second portion.

3. The method of claim 1, wherein forming a corner comprises forming the edge condition as a chamfer.

4. The method of claim 1, wherein forming a corner comprises forming the edge condition as a round.

5. The method of claim 1, further comprising:

performing the hard machining of the at least one orifice by a machine tool, wherein the holding fixture is a stationary holding fixture of the machine tool.

6. The method of claim 1, wherein the determining the desired orifice size comprises:

selecting the desired orifice size based on a graph correlating a set of orifice sizes to a set of flow rates.

7. The method of claim 1, wherein the at least one orifice further comprises a second orifice comprising a cross hole, wherein the method further comprises:

hard machining the second orifice into the heat-treated fuel system component, wherein the second orifice has a different configuration than the first orifice.

8. The method of claim 7, wherein the hard machining the second orifice comprises:

forming a flat bottom pilot, and end machining the cross hole into the flat bottom pilot.

9. The method of claim 1, wherein the hard machining the first orifice comprises:

drilling the first portion to a rough flat in the heat-treated blank of the heat-treated fuel system component;

machining a surface of the drilled first portion to the finish flat in the heat-treated blank of the heat-treated fuel system component; and drilling the second portion from the finish flat to an exterior of the heat-treated blank of the heat-treated fuel system component to form the corner.

10. The method as in claim 1, wherein mounting the heat-treated blank of the heat-treated fuel system component into a holding fixture includes mounting an injector needle blank as the heat-treated fuel system component.

11. The method of claim 1, wherein the heat-treated fuel system component is an injector needle.

12. A heat-treated fuel system component comprising:

a heat-treated body; and at least one orifice hard machined into the heat-treated body based on a desired flow rate of the at least one orifice, wherein the at least one orifice comprises a first orifice, the first orifice having a first portion and a second portion, wherein the first portion is hard machined into the heat-treated body to a finish flat;

wherein the second portion is hard machined through the heat-treated body from the finish flat of the first portion to an exterior of the body such that a corner is formed between the finish flat of the first portion and the second portion, wherein a diameter of the second portion is smaller than a diameter of the first portion, and wherein the corner between the first portion and the second portion is formed so that an edge condition exists between the finish flat of the first portion and the second portion of the first orifice having a dimension of 100 microns or less.

13. The heat-treated fuel system component of claim 12, wherein the edge condition comprises a chamfer.

14. The heat-treated fuel system component of claim 12, wherein the edge condition comprises a round.

15. The heat-treated fuel system component of claim 12, wherein the at least one orifice further comprises a second orifice, the second orifice comprising at least one of a flat bottom pilot and a cross hole.

16. The heat-treated fuel system component of claim 12, wherein the first orifice comprises:

a drilled first portion into the heat-treated body of the heat-treated fuel system component that is machined to a smoother surface to the finish flat; and a drilled second portion from the finish flat to an exterior of the heat-treated body of the heat-treated fuel system component.

17. The heat-treated fuel system component as in one of claim 12, wherein the heat-treated fuel system component comprises an injector needle.

18. A machining system comprising:

a component fixture configured to mount a heat-treated blank of a heat-treated fuel system component; and a machine tool configured to:

form a first portion of an orifice to a finish flat in the heat-treated blank of the heat-treated fuel system component, and form, at an end of the first portion, a second portion of the orifice to an exterior of the heat-treated blank of the heat-treated fuel system component so that a corner is formed between the finish flat of the first portion and the second portion, wherein a diameter of the second portion is smaller than a diameter of the first portion; and the corner being formed so that an edge condition exists between the finish flat of the first portion and the second portion of the first orifice having a dimension of 50 microns or less.

19. The system of claim 18, further comprising a forming component configured to receive a drill bit and to translate up and down relative to the component fixture to drill the at least one orifice into the heat-treated fuel system component held by the component fixture.

20. The system of claim 18, wherein the component fixture is formed of a rigid material configured to support a load applied to the fixture.

* * * * *